(12) United States Patent
Caporale et al.

(10) Patent No.: US 10,293,683 B2
(45) Date of Patent: May 21, 2019

(54) FLUIDS TANK FOR WORK MACHINE

(71) Applicant: CNH Industrial America LLC, New Holland, PA (US)

(72) Inventors: Davide Caporale, Caselle Torinese (IT); Mauro Loprevite, San Mauro Torinese (IT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/758,229

(22) PCT Filed: Sep. 7, 2016

(86) PCT No.: PCT/EP2016/071080
§ 371 (c)(1),
(2) Date: Mar. 7, 2018

(87) PCT Pub. No.: WO2017/042214
PCT Pub. Date: Mar. 16, 2017

(65) Prior Publication Data
US 2018/0251021 A1  Sep. 6, 2018

(30) Foreign Application Priority Data
Sep. 7, 2015  (IT) .............................. UB2015A3434

(51) Int. Cl.
*B60K 15/03* (2006.01)
(52) U.S. Cl.
CPC ........ *B60K 15/03177* (2013.01); *B60K 15/03* (2013.01); *B60K 2015/03032* (2013.01);
(Continued)

(58) Field of Classification Search
CPC .............. B60K 15/03; B60K 15/03006; B60K 15/03177; B60K 2015/03118; B60K 2015/03105; B60K 2015/03348; B60K 2015/03032; B60K 2015/03151; B60K 2015/03421; B60Y 2200/412; B60Y 2400/14
(Continued)

(56) References Cited

U.S. PATENT DOCUMENTS 4,015,728 A * 4/1977 Barker .................... E02F 3/384
414/715
6,223,526 B1 * 5/2001 Wissler .................. B60K 15/03
60/286

(Continued)

FOREIGN PATENT DOCUMENTS

DE  102008028277 A1  12/2009
DE  102013105884 A1  12/2014
(Continued)

*Primary Examiner* — John D Walters
(74) *Attorney, Agent, or Firm* — Peter K. Zacharias; Peter M. Sheldrake

(57) ABSTRACT

An excavator has a unitary fluids tank formed from moldable cross linked high density polyethylene. The fluids tank has a compartment for hydraulic fluid and a compartment for power unit fuel. The compartments are separated by a coextensive integral wall providing an insulating barrier are formed from a polyethylene foam providing an insulating barrier between the compartments.

8 Claims, 2 Drawing Sheets

(52) U.S. Cl.
CPC ........... *B60K 2015/03118* (2013.01); *B60K 2015/03151* (2013.01); *B60K 2015/03421* (2013.01); *B60Y 2200/412* (2013.01); *B60Y 2400/14* (2013.01)

(58) Field of Classification Search
USPC .......................................... 180/69.4; 60/508
See application file for complete search history.

(56) References Cited

U.S. PATENT DOCUMENTS

| | | | |
|---|---|---|---|
| 6,810,661 B2* | 11/2004 | Lambert | B01D 53/90 60/286 |
| 8,490,821 B2 | 7/2013 | Tam et al. | |
| 2009/0103838 A1* | 4/2009 | Fonkalsrud | B60K 15/03177 383/38 |
| 2016/0214479 A1* | 7/2016 | Tanaka | B29C 49/04 |

FOREIGN PATENT DOCUMENTS

| | | | |
|---|---|---|---|
| EP | 1736350 A2 | 12/2006 | |
| FR | 2975641 A1 | 11/2012 | |
| WO | 2006045672 A1 | 5/2006 | |
| WO | 2009078757 A1 | 6/2009 | |
| WO | 2015046307 A1 | 4/2015 | |

\* cited by examiner

FLUIDS TANK FOR WORK MACHINE

BACKGROUND OF THE INVENTION

1. Field of the Invention

The present invention relates to work machines and more specifically to fluid tanks for such machines.

2. Background of the Invention

Work machines, such as excavators, require tanks to store fluid of various types utilized by the machine. Examples of typical fluids may be: fuel for consumption by the engine, hydraulic fluid for use in the machine actuating system, engine lubricant and diesel exhaust fluid (DEF). The usual practice for employing fluid tanks is to incorporate a separate tank for each fluid because of unique environmental conditions for each fluid. Such conditions may be differences in operating temperatures, chemical compositions, operating pressures and the like. While this serves the individual nature of the fluids, it requires separate tanks that usually lead to separate suppliers, quality control and mounting, all of which add to the complexity and theoretically having an impact on reliability.

It has been proposed that a unified tank be incorporated in patent DE10 2013 105884A1. This reference illustrates a unitary tank with a separating wall molded in. The fluids for use in this reference are fuel consumed by an engine and a smaller reservoir for DEF. The fuel and DEF operate under similar conditions in that they are consumable fluids operating under similar temperature conditions in the tank.

Accordingly, what is needed in the art is a simplified fluids tank for a work machine that accommodates fluids having differing operating conditions.

SUMMARY OF THE INVENTION

The present invention seeks to simplify the provision of unitary tanks for fluids in a work machine.

In one form, the invention is a fluids tank for a work machine including a unitary body of moldable material defining first and second compartments for different fluids with a coextensive integral wall separating the first and second compartments, the coextensive wall providing an insulating heat transfer barrier between the compartments for fluids having different operating temperatures.

In another form, the invention is an excavator having a frame, ground movement mechanism, a fuel consuming power unit, a hydraulic actuation system and a fluids tank, all mounted on the frame. The fluids tank includes a unitary body of moldable material defining first and second compartments for different fluids, the fluids tank having a coextensive integral wall separating the first and second compartments, with the coextensive wall providing an insulating heat transfer barrier between the compartments for fluids operating at different temperatures.

One benefit of the present invention is that a fluid tank for two fluids may be molded in one process.

Another advantage is that the fluid tank can accommodate fluids having different operating temperatures.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
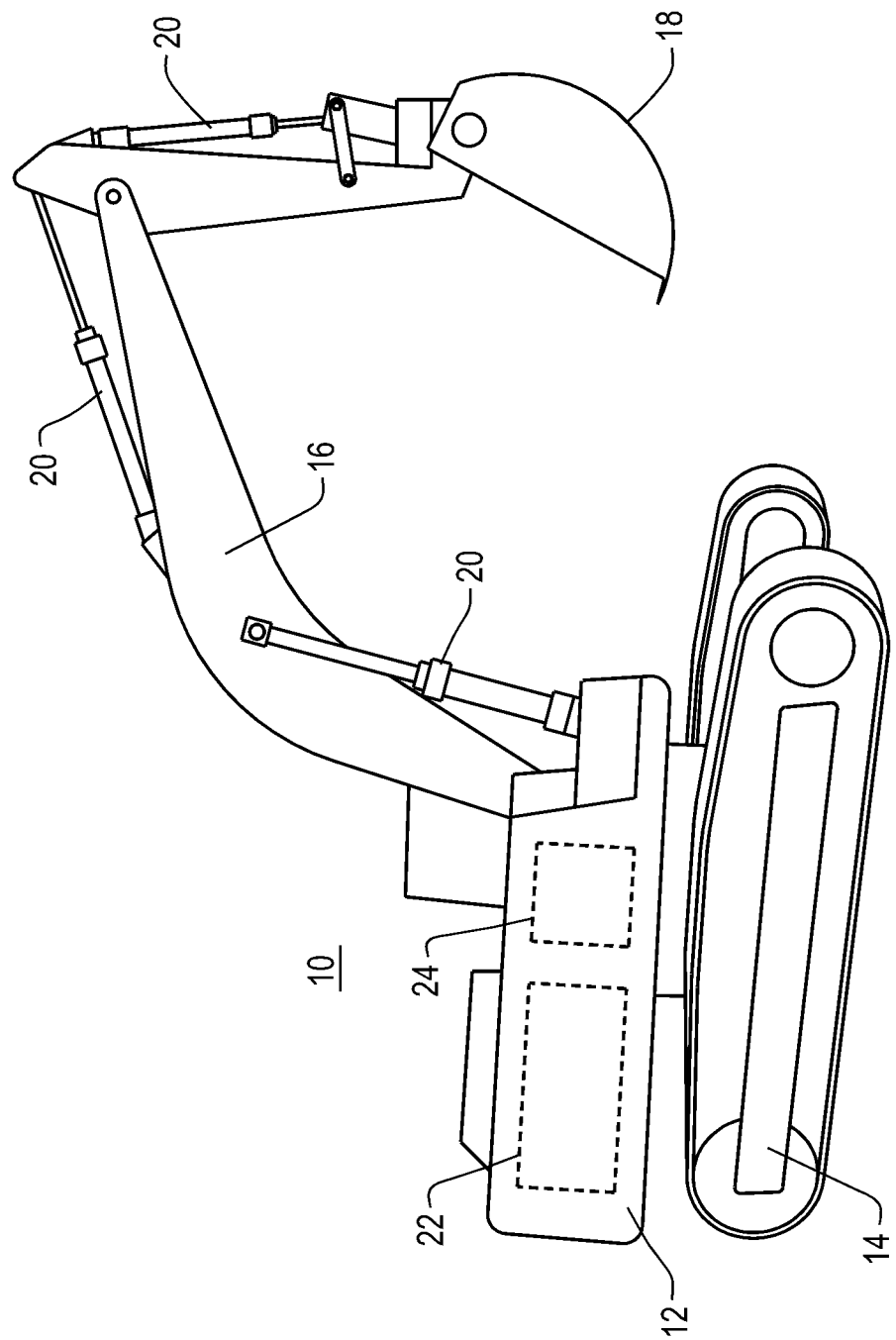
FIG. 1 is a side view of an excavator work machine with which the present invention may be used; and, FIG. 2 is a cross sectional view of a fluids tank embodying the present invention.

Referring to FIG. 1, there is shown a work machine in the form of an excavator, having as its primary purpose, excavating material on a site for construction or other purposes. The work machine 10 has a frame 12 for supporting its major components, including a ground movement assembly 14, herein shown as a crawler tractor arrangement. It should be apparent that ground movement assemblies other than crawler tractor arrangement 14 may be utilized with the present invention. The frame 12 also supports a boom arm assembly 16 having a plurality of articulated joints that ultimately connect to a bucket 18 for excavation purposes. Multiple hydraulic actuators 20 cause movement in the boom arm assembly 16 and the bucket 18 to provide the excavating function.

The work machine 10 is powered by a power unit shown schematically at 22. In usual practice the power unit 22 is a compression ignition or diesel engine owing to its fuel efficiency and durability. The diesel engine consumes diesel fuel for its operation. The actuators 20 are supplied with hydraulic fluid from a hydraulic actuation system (not shown). The hydraulic actuation system recirculates hydraulic fluid and for that purpose requires a tank to accommodate thermal dissipation and replenishment of leaked fluids. The power unit 12 also requires a tank for fuel. These needs are met by a fluids tank 24, shown schematically in FIG. 1 and in detail in FIG. 2.

Figure 2:
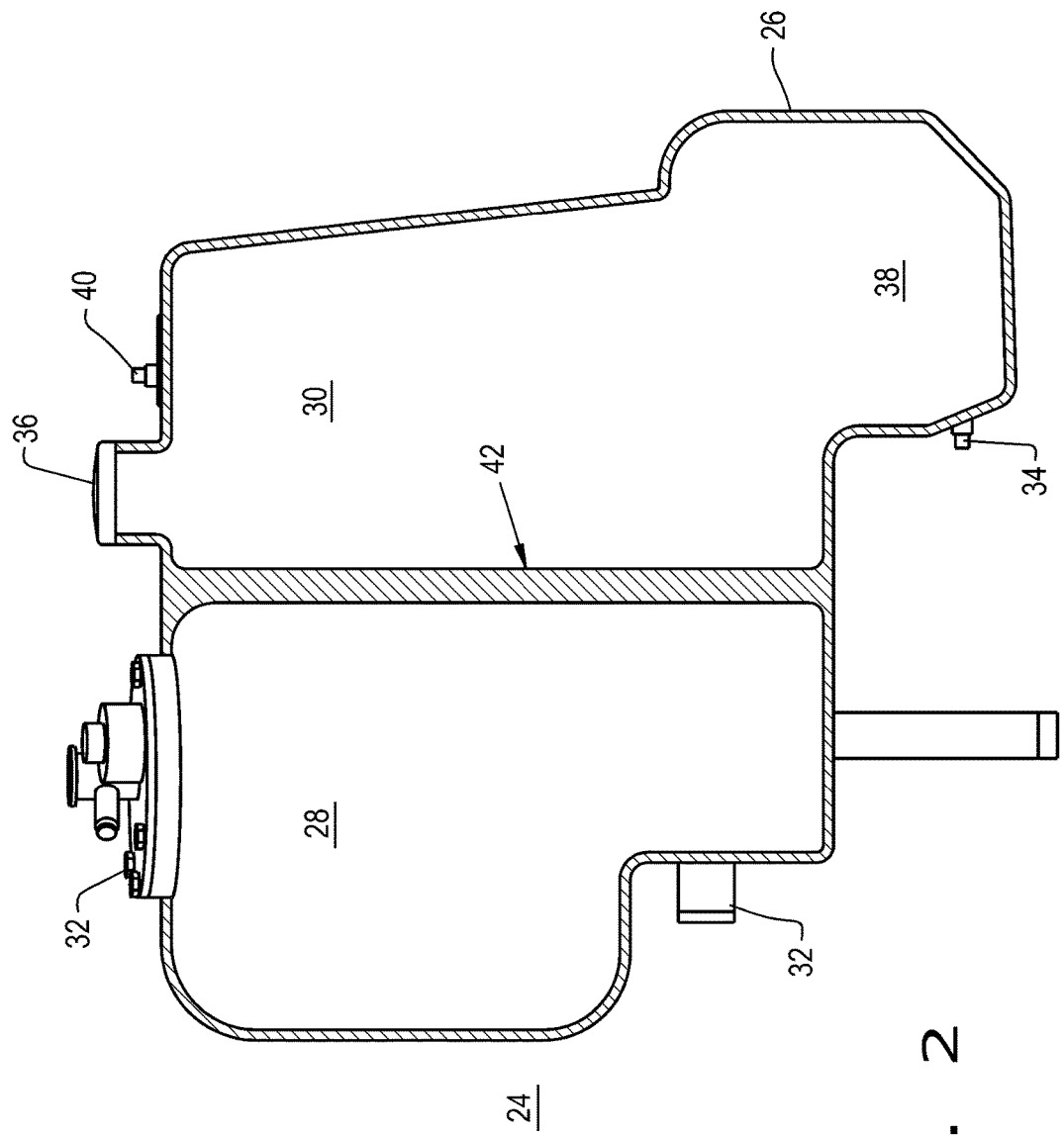

Referring to FIG. 2, the fluids tank 24 includes a moldable plastic material 26 defining a first compartment 28 and a second compartment 30. First compartment 28 has fluid access fittings adapted for use in the hydraulic system powering the actuators 20. Many hydraulic systems provide a constant flow of fluid from a hydraulic pump past the actuators and to the tank where it is repressurized for further use. The action of pumping up the hydraulic fluid to required actuation pressures causes an increase in operating temperatures that can be as high as 60 to 90 degrees C.

The compartment 30 receives fuel to be consumed by the power unit 22 and has a fuel supply outlet fitting at a lower portion of the compartment 30, a removable fill cap 36 for enabling replenishment of the compartment 30 with fuel and a breather fitting 40 to accommodate the significant change in fuel volume in the tank over a given operating period. The compartment 30 also has a sump area 38 that is a recess lower at the lowest portion of compartment 30 to insure a liquid supply as the compartment 30 has fuel significantly removed from it.

In accordance with the present invention, the fluids tank 24 has a coextensive integral wall 42 separating the first and second compartments 28 and 30. The wall 42 is formed from material providing an insulating and heat transfer barrier between the compartments. This prevents the operating temperatures in the hydraulic fluid compartment 28, which range from 60 to 90 degrees C., from elevating the temperature of fuel within compartment 30 which can range from 30 to 70 degrees C. maximum to prevent efficiency losses. A preferred material for forming a tank is a polyethylene material and the coextensive integral wall is formed from a polyethylene foam. An example of a suitable material is a cross linkable high density polyethylene developed for rotational molding and available from ICO polymers under the designation Icorene 1500 black 9000. A desirable heat transfer coefficient for the coextensive internal wall integral wall 42 is 0.040 WATT/square meters/KELVIN. It should be apparent however to those skilled in the art that materials other than the one described above may be employed to provide the unitary tank having two different fluids.

In another embodiment (not shown) the coextensive wall 42 is formed including air enclosures. The stationary air of these enclosures form the insulating and heat transfer barrier between the compartments. It is understood that a combination of rigid coextensive walls or foamed coextensive walls with air enclosures can provide a suitable limitation of heat transfer between the compartments 28 and 30.

The fluids tank 24 is mounted within the work machine 10 at a convenient location. The filling of the fuel dictates that an access door be opened and that the fluid level in the hydraulic tank may be conveniently inspected and determined at the time fuel is introduced into compartment 30. Notwithstanding the fact that the fluids within the compartments 28 and 30 are operating at significantly different temperatures, the provision of the insulating coextensive wall 42 provides an effective thermal barrier during operating conditions.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A fluids tank for a work machine, the fluids tank comprising:
    a unitary body of moldable material defining first and second compartments for different fluids; and
    a coextensive integral wall separating the first and second compartments, the coextensive wall providing an insulating heat transfer barrier between the compartments for containing fluids at different operating temperatures, the coextensive wall comprising air enclosures.

2. The fluids tank as claimed in claim 1, wherein the fluids comprise a hydraulic fluid and a fuel for a power unit.

3. The fluids tank as claimed in claim 1, wherein the compartments have different volumes.

4. The fluids tank as claimed in claim 1, wherein the moldable material is a polyethylene and the coextensive integral wall is polyethylene foam.

5. The fluids tank as claimed in claim 4, wherein a heat transfer coefficient of the coextensive integral wall is about 0.040 watts/square meter/Kelvin.

6. The fluids tank as claimed in claim 1, wherein a maximum operating temperature in one of the first and second compartments is up to 90 degrees C. and a maximum operating temperature in the other of the first and second compartment is up to 70 degrees C.

7. The fluids tank as claimed in claim 1, wherein the moldable material is a cross linkable high density polyethylene.

8. A work machine comprising:
    a frame,
    a ground movement assembly;
    a boom arm assembly;
    hydraulic actuators mounted on the frame to articulate the boom arm assembly;
    a power unit mounted on the frame; and
    a fluids tank comprising:
        a unitary body of moldable material defining first and second compartments for different fluids; and
        a coextensive integral wall separating the first and second compartments, the coextensive wall providing an insulating heat transfer barrier between the compartments for containing fluids at different operating temperatures,
    wherein the fluids tank is mounted on the frame and supplies fuel to the power unit and hydraulic fluid to the hydraulic actuators, and
    wherein a larger of the first and second compartments has a sump area at a bottom thereof for a fuel output supply fitting.

* * * * *